United States Patent
Wallis et al.

(10) Patent No.: US 12,164,898 B2
(45) Date of Patent: Dec. 10, 2024

(54) AUTOMATED DEPLOYMENT OF CHANGES TO APPLICATIONS ON A CLOUD COMPUTING PLATFORM

(71) Applicant: Capital One Services, LLC, McLean, VA (US)

(72) Inventors: Shawn Wallis, Midlothian, VA (US); Robert Wright, Henrico, VA (US); Giovanni Torres, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 126 days.

(21) Appl. No.: 17/173,537

(22) Filed: Feb. 11, 2021

(65) Prior Publication Data

US 2022/0253297 A1      Aug. 11, 2022

(51) Int. Cl.
| | |
|---|---|
| *G06F 11/36* | (2006.01) |
| *G06F 8/30* | (2018.01) |
| *G06F 8/61* | (2018.01) |
| *G06F 8/65* | (2018.01) |
| *G06F 8/71* | (2018.01) |
| *H04L 9/40* | (2022.01) |
| *H04L 67/00* | (2022.01) |
| *H04L 67/10* | (2022.01) |

(52) U.S. Cl.
CPC .............. *G06F 8/65* (2013.01); *G06F 8/61* (2013.01); *G06F 8/71* (2013.01); *G06F 11/3664* (2013.01); *H04L 63/0876* (2013.01); *H04L 67/34* (2013.01); *H04L 67/10* (2013.01)

(58) Field of Classification Search
CPC ...... H04L 67/34; H04L 67/10; G06F 11/3664; G06F 11/3684; G06F 11/3672; G06F 8/71; G06F 8/61
See application file for complete search history.

(56) References Cited

U.S. PATENT DOCUMENTS

| | | | |
|---|---|---|---|
| 10,114,637 B1 * | 10/2018 | Willson | G06F 8/71 |
| 2015/0143327 A1 * | 5/2015 | Holmes | G06Q 10/06 717/101 |
| 2018/0054490 A1 * | 2/2018 | Wadhwa | G08G 1/0129 |
| 2020/0019493 A1 * | 1/2020 | Ramakrishna | G06F 8/65 |
| 2020/0272786 A1 * | 8/2020 | Pandurangarao | G06K 9/6262 |
| 2021/0111898 A1 * | 4/2021 | McCarty | H04L 63/0853 |
| 2021/0266303 A1 * | 8/2021 | Pollutro | H04L 63/0435 |
| 2021/0287681 A1 * | 9/2021 | Singh | G06F 21/32 |

(Continued)

*Primary Examiner* — S. Sough
*Assistant Examiner* — Mohammad H Kabir
(74) *Attorney, Agent, or Firm* — Harrity & Harrity, LLP

(57) ABSTRACT

In some implementations, a system may receive code for a package to be deployed on a cloud computing platform. The system may cause the cloud computing platform to build the package from the code. The system may install the package on the cloud computing platform in a first non-production environment, wherein the first non-production environment is a development environment. The system may automatically test the package in the first non-production environment based on first testing information for the first non-production environment in a configuration file associated with the code. The system may deploy the package on the cloud computing platform in a production environment. The system may automatically test the package in the production environment based on second testing information for the production environment in the configuration file.

20 Claims, 9 Drawing Sheets

(56) References Cited

U.S. PATENT DOCUMENTS

2021/0318948 A1\* 10/2021 Subbunarayanan ........................ G06F 11/3688
2022/0239736 A1\* 7/2022 Magana Perdomo ...................... H04L 67/306

\* cited by examiner

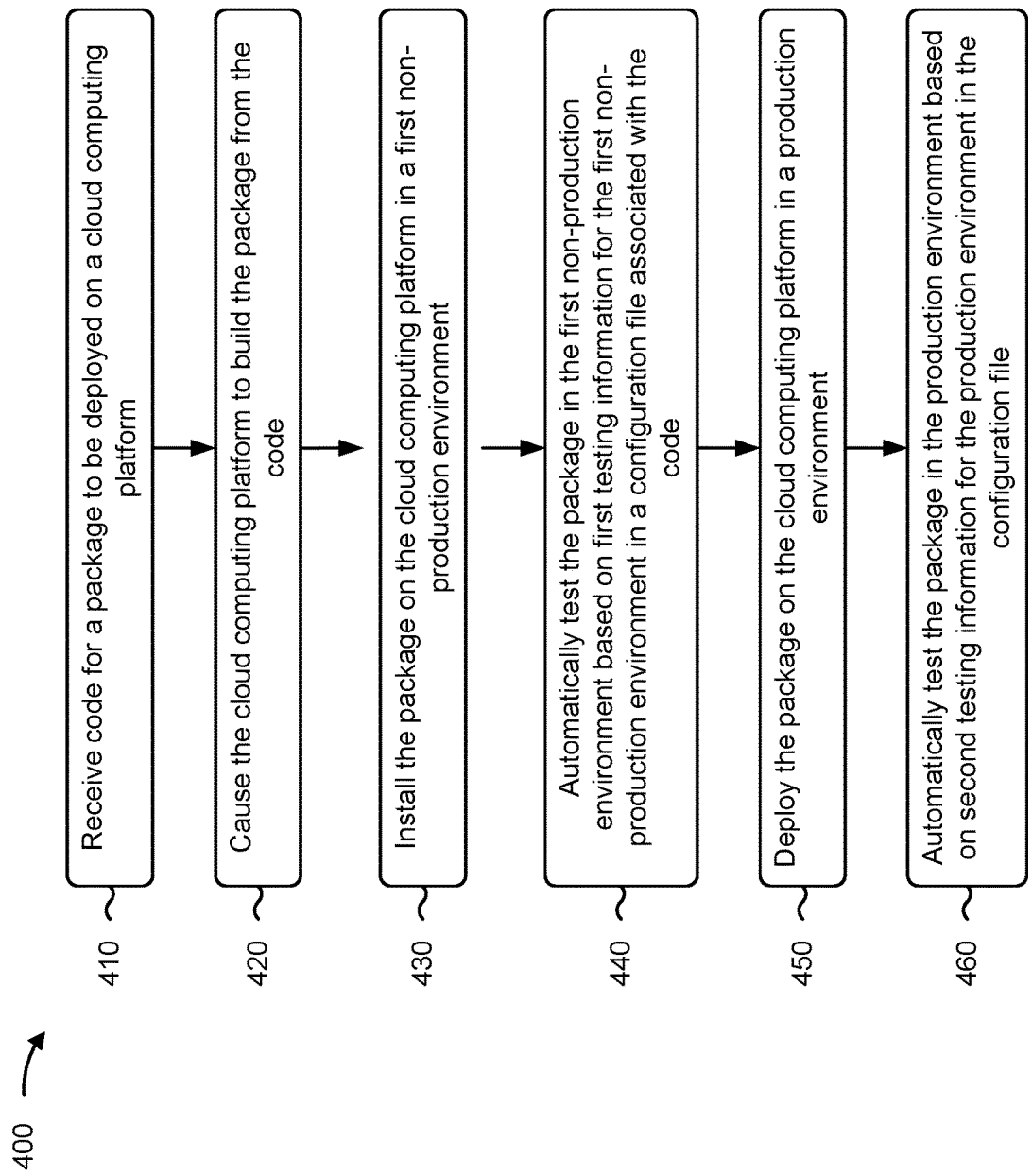

AUTOMATED DEPLOYMENT OF CHANGES TO APPLICATIONS ON A CLOUD COMPUTING PLATFORM

BACKGROUND

Cloud computing refers to network-based on-demand availability of computer system resources, such as data storage and computing power. Cloud computing providers typically offer service according to different service models, including Infrastructure as a Service (IaaS), Platform as a Service (PaaS), and Software as a Service (SaaS). In PaaS, a cloud provider may provide a cloud computing platform that allows customers to develop, run, and manage software applications using programming languages, libraries, services, and tools supported by the cloud provider, without the customer having to manage the underlying cloud infrastructure, such as the network, servers, operating systems, or storage.

SUMMARY

In some implementations, a system for deploying an updated software package on a cloud computing platform includes one or more memories and one or more processors, communicatively coupled to the one or more memories, configured to: receive, from a version control system storing source code for a software package deployed on a cloud computing platform, updated code including one or more changes to the source code; automatically authenticate the system with the cloud computing platform for a package registration environment, one or more non-production environments, and a production environment; build an updated package corresponding to the updated code in the package registration environment on the cloud computing platform; automatically deploy the updated package on the cloud computing platform in each of the one or more non-production environments and test the updated package in each of the one or more non-production environments based on respective testing information for each of the one or more non-production environments in a configuration file associated with the updated code; and automatically deploy the updated package on the cloud computing platform in the production environment and test the updated package in the production environment based on testing information for the production environment in the configuration file.

In some implementations, a method of deploying a package on a cloud computing platform includes receiving, by a system, code for a package to be deployed on a cloud computing platform; causing, by the system, the cloud computing platform to build the package from the code; installing, by the system, the package on the cloud computing platform in a first non-production environment, wherein the first non-production environment is a development environment; automatically testing, by the system, the package in the first non-production environment based on first testing information for the first non-production environment in a configuration file associated with the code; deploying, by the system, the package on the cloud computing platform in a production environment; and automatically testing the package in the production environment based on second testing information for the production environment in the configuration file.

In some implementations, a non-transitory computer-readable medium storing a set of instructions includes one or more instructions that, when executed by one or more processors of a system, cause the system to: receive, from a version control system storing source code for a software package deployed on a cloud computing platform, updated code including one or more changes to the source code; authenticate the system with the cloud computing platform for a package registration environment; build an updated package corresponding to the updated code in the package registration environment on the cloud computing platform; authenticate the system with the cloud computing platform for one or more non-production environments; for each environment of the one or more non-production environments: install the updated package on the cloud computing platform in the environment, and test the updated package in the environment based on testing information for the environment in a configuration file associated with the updated code; authenticate the system with the cloud computing platform for a production environment; and deploy the updated package on the cloud computing platform in the production environment.

BRIEF DESCRIPTION OF THE DRAWINGS

FIG. 4 is a flowchart of an example process relating to automated deployment of changes to applications on a cloud computing platform.

DETAILED DESCRIPTION

Figure 1A:
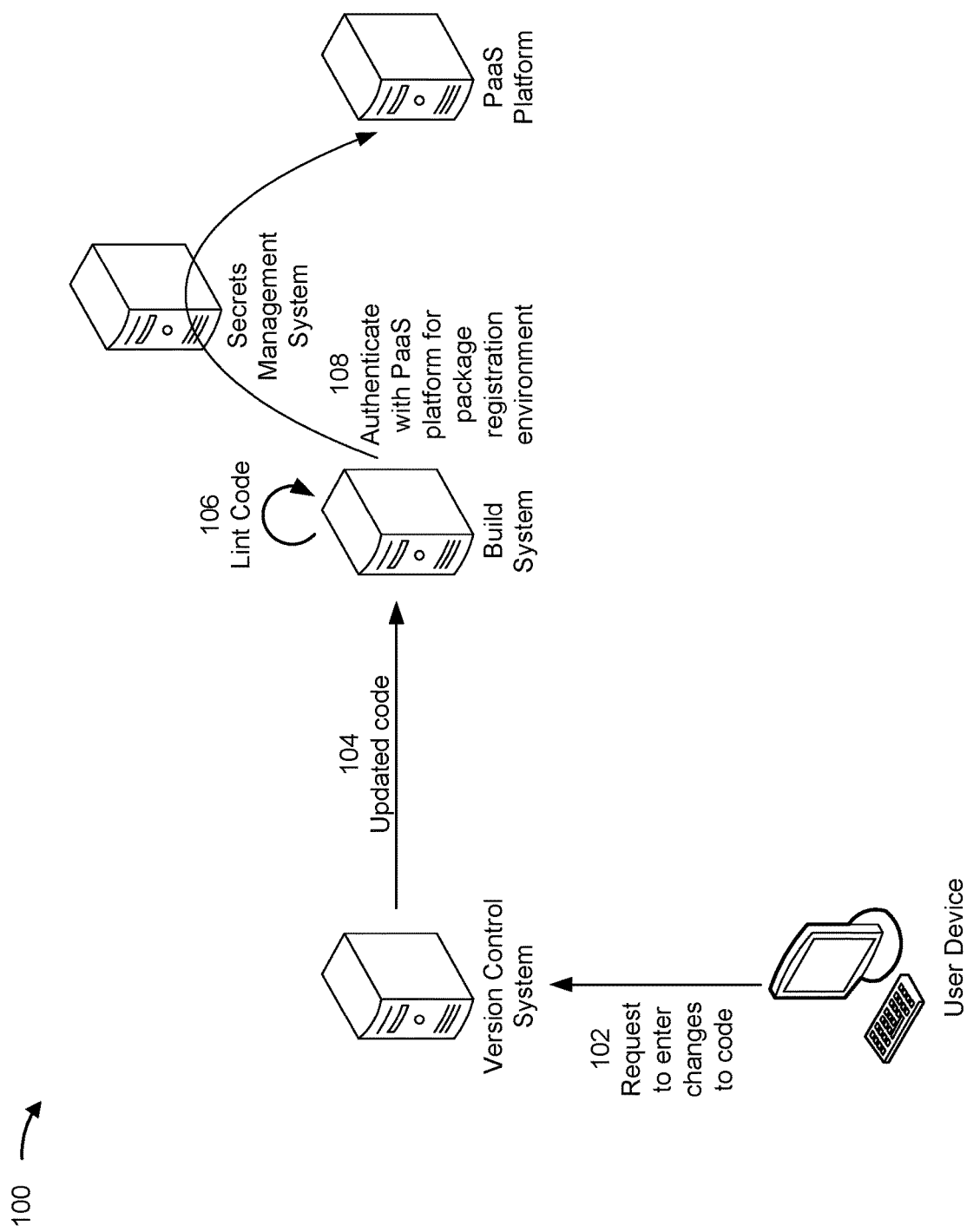
FIGS. 1A-1F are diagrams of an example implementation relating to automated deployment of changes to applications on a cloud computing platform.

The following detailed description of example implementations refers to the accompanying drawings. The same reference numbers in different drawings may identify the same or similar elements.

Platform as a Service (PaaS) cloud computing platforms typically utilize a mono repository (monorepo) design, in which code parts for all software applications deployed on the PaaS platform are stored in a single repository. In this case, all changes to code parts in the monorepo are deployed together, and deploying the changes to the code parts involves deployment of a monorepo package for all of the code changes in the monorepo. Each deployment is typically managed by a user who determines which code has changed and how to declare those changes in a package descriptor file. Additionally, the package and the package descriptor file may be non-idempotent between different environments on the same platform, so deployments through a pipeline of multiple environments on the platform typically require manual intervention at every step. Accordingly, this manual deployment process may be time-consuming, expensive, error-prone, and unreliable. For example, a deployment may require many hours from multiple developers to debug, test, and eventually deploy the changes. Due to the level of effort involved with deployments, such deployments are typically performed infrequently, such as monthly or quarterly. Furthermore, because the code changes in such packages are not thoroughly audited, it may be difficult to find, in the code, the cause of errors or "bugs" in the applications deployed on the platform. As a result, root cause analysis and bug fixing may be very time-consuming, and may thus consume significant computing and memory resources.

Some implementations described herein enable automated deployment of changes to applications on a PaaS platform. In some implementations, a system may receive, from a version control system, updated code including one or more changes to source code stored in the version control system. The system may automatically perform system authentication for different environments with the PaaS platform. The system may automatically build a package corresponding to the updated code in a package registration environment on the PaaS platform. The system may automatically deploy the package in one or more non-production environments on the PaaS platform, and the system may automatically test the package in each of the one or more non-production environments based on testing information associated with the non-production environments in a configuration file associated with the updated code. The system may automatically deploy the package in the production environment on the PaaS platform, and the system may automatically test the package in the production environment based on testing information associated with the production environment in the configuration file. As a result, deployment of changes to an application on the PaaS platform may be performed quickly and more often, with increased reliability, decreased errors, and decreased risks to other applications on the PaaS platform.

In some implementations, the system may tag the updated code in the version control system with metadata that includes a package version identifier associated with the package on the PaaS platform that corresponds to the updated code. Thus, changes in a package may be traced back to an exact version of the code in the version control system, which may decrease the difficulty and time required to determine the cause of a bug and/or to fix a bug in the deployed package. As a result, computing resources and memory resources associated with debugging the deployed package may be reduced.

FIGS. 1A-1F are diagrams of an example 100 associated with automated deployment of changes to applications on a cloud computing platform. As shown in FIGS. 1A-1F, example 100 includes a user device, a version control system, a build system, a secrets management system, a PaaS platform, and a change management system. These devices are described in more detail in connection with FIGS. 2 and 3.

As shown in FIG. 1A, and by reference number 102, the user device may transmit, to the version control system, a request to enter changes to code stored in the version control system. The version control system may store source code for software applications that are deployed or are to be deployed on the PaaS platform. In some implementations, the version control system may isolate code parts for different applications and/or different portions of an application, for example in different repositories. In this case, each isolated code part (e.g., in a respective repository) may be source code for a respective package that is deployed or is to be deployed on the PaaS platform.

Based on a request from the user device to change a portion of the source code for a particular package (e.g., a "pull request"), the version control system may create a copy of a portion of the source code that may be changed by a user. For example, such a copy of a portion of the source code may be referred to as a "branch" (or "branch code") and the source code for a particular package may be referred to as the "master branch" (or "master branch code"). The user, via an input component of the user device, may make changes to the branch, resulting in updated code. The changes to the branch may be saved in one or more commits, which are snapshots of changes to the code at a particular time. Once one or more changes are added to the branch, the user device may transmit, to the version control system, a request to enter the changes to the code. For example, the user device may transmit, to the version control system, a request to merge the current branch with the master branch (e.g., replace corresponding portion of the source code with the updated code in the current branch).

As further shown in FIG. 1A, and by reference number 104, the version control system may transmit a copy of the updated code to the build system. The copy of the updated code received by the build system, or "checked out" from the version control system, may correspond to a most recent commit of the current branch. In some implementations, the version control system, based on receiving the request to enter the changes to the code, may transmit the copy of the updated code to the build system and may cause or instruct the build system to initiate an automated build procedure for the updated code.

The version control system may store a configuration file that includes information that governs or controls the automated build procedure. For example, the configuration file may include information relating to linting and/or static scanning of the updated code, information that identifies a package to be built for the updated code, information that indicates how to build the package, information that indicates in which environments the package is to be deployed on the PaaS platform, and/or information that indicates how the package should be tested in each environment, among other examples. In some implementations, the configuration file may be associated with the source code for a particular package, such that the same configuration file governs the build procedure for all requested changes to the source code. For example, the version control system may store source code for different logical applications in different repositories, and the version control system may store a respective configuration file for each repository. In some implementations, the version control system may generate and store a configuration file for each request to enter changes to code.

In some implementations, the version control system may store status information that tracks the status of the automated build procedure. As the build system progresses through the automated build procedure, the build system may update the status information in the version control system to indicate a current status of the automated build procedure. For example, the build system may update the status information based on completing each stage of the automated build procedure (e.g., linting, building the package, static scanning, deployment in each environment, and/or testing in each environment). In some implementations, the version control system may generate a status report that may be transmitted to and/or displayed on the user device to indicate the status of the automated build procedure to the user. For example, the status report may include visual indicators for each stage of the automated build process that has been successfully completed.

As further shown in FIG. 1A, and by reference number 106, the build system may perform linting of the updated code. Linting refers to analyzing the code to check for syntax and/or formatting errors. In some implementations, the build system may perform linting of the updated code based on linting rules included in the configuration file. For example, the configuration file may include default linting rules that detect improper formatting and/or syntax in the updated code that may result in errors. Additionally, or alternatively, the configuration file may include custom linting rules (e.g., for a particular organization, team, application, or project) to enforce customized syntax and/or formatting. This may provide an added benefit of enforcing standards and/or increasing consistency in syntax and formatting among different users, which may result in code that is easier to review and debug.

As further shown in FIG. 1A, and by reference number 108, the build system may authenticate with the PaaS platform for a package registration environment. The package registration environment may be an environment on the PaaS platform for building packages and registering packages with the PaaS platform. In some implementations, the build system may perform automatic authentication, as a system (e.g., not using an account associated with an individual human user), with the PaaS platform for the package registration environment. During the automated build procedure, the build system may perform automatic authentication with the PaaS platform for various environments, such as the package registration environment, one or more non-production environments (e.g., a development environment, a quality assurance environment, and/or a user test environment, among other examples), and a production environment. Automatic authentication of the build system with the PaaS platform for a particular environment (e.g., the package registration environment) is described in greater detail below in connection with FIG. 1B.

Figure 1B:
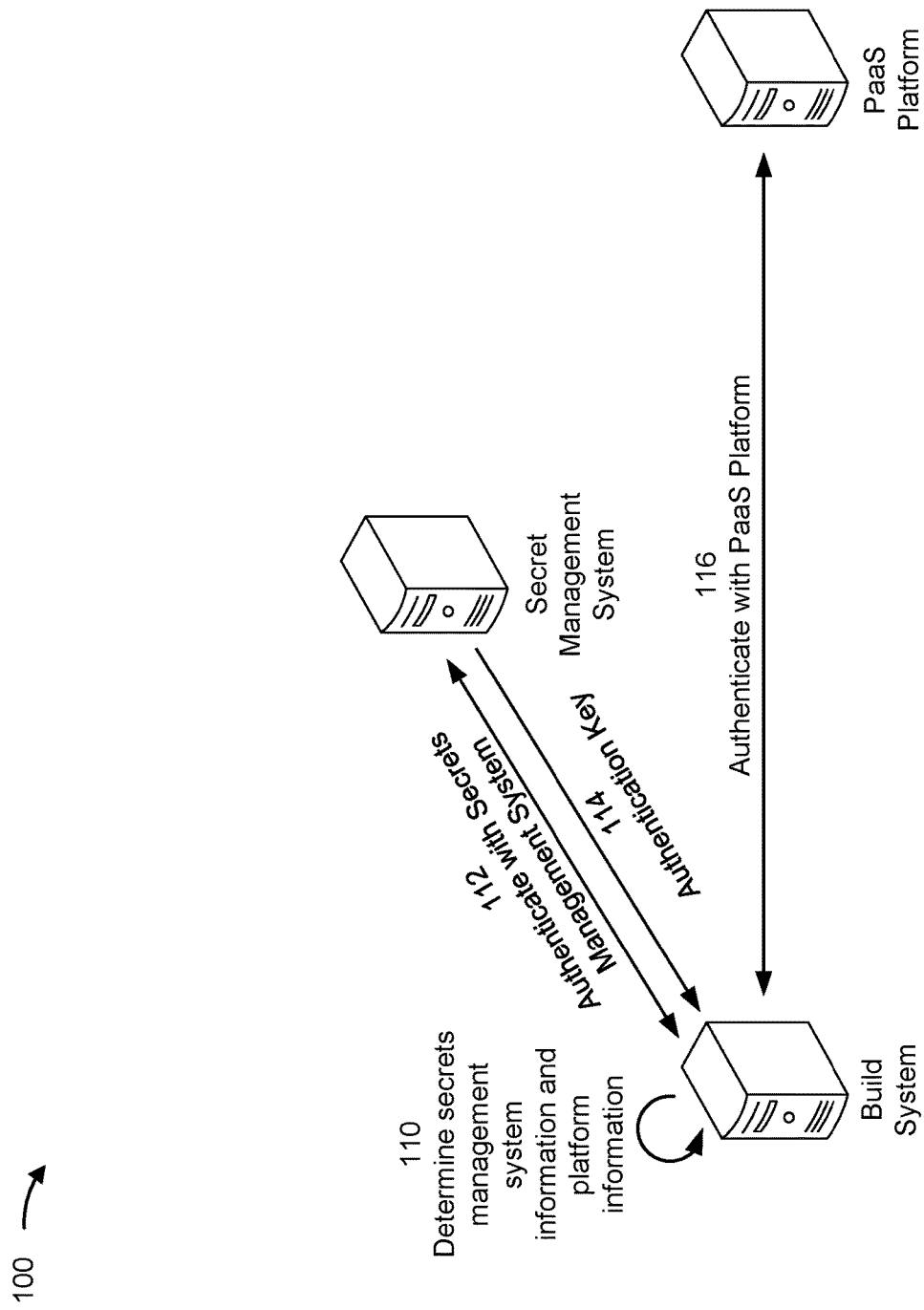

As shown in FIG. 1B, and by reference number 110, the build system may determine secrets management system information and platform information. In some implementations, the secrets management system information and the platform information may be stored on the build system, and the build system may retrieve the secrets management system information and the platform information based on an account credential and a current stage of the automated build procedure. For example, the account credential may be an account name provided by the user with the request to enter the changes to the code, and the build system may use the account name to resolve technical details to transact with the secrets management system and perform authentication with the PaaS platform (e.g., using the secrets management system information and the platform information).

The secrets management system information may include secrets management system authentication information, such as a secrets management system login credential (e.g., username and password, or sensitive keys) for performing authentication with the secrets management system. Additionally, or alternatively, the secrets management system information may identify a specific storage location in the secrets management system, for example corresponding to the account credential and/or the environment to be accessed on the PaaS platform. The platform information may include a platform login credential (e.g., username) and/or may identify an environment endpoint for the particular environment to be accessed on the PaaS platform. In some implementations, the platform login credential may be an environment-specific login credential for the particular environment to be accessed on the PaaS platform.

As further shown in FIG. 1B, and by reference number 112, the build system may authenticate with the secrets management system. The build system may authenticate with the secrets management system using the secrets management system information. For example, the build system may authenticate with the secrets management system using the secrets management system authentication information.

As further shown in FIG. 1B, and by reference number 114, the build system may receive an authentication key from the secrets management system. The secrets management system may encrypt and store authentication keys associated with different environments of the PaaS platform. For example, the authentication keys may be application program interface (API) keys that allow the build system to authenticate with different environments on the PaaS platform. In some implementations, the authentication keys and/or the encryption keys used to encrypt the authentication keys may be changed periodically. The build system may retrieve, from the secrets management system, the authentication key for the particular environment to be accessed on the PaaS platform based on the current stage of the automated build procedure.

As further shown in FIG. 1B, and by reference number 116, the build system may authenticate with the PaaS platform for the particular environment using the authentication key. In some implementations, the build system may authenticate with the PaaS platform for the particular environment using the authentication key for the environment and based on the platform information, such as the platform login credential and/or the information identifying the environment endpoint for the environment. In some implementations, the build system may locally checkout the authentication key from the secrets management system, and the local checkout of the authentication key may last or be valid for only for the span of the action(s) being performed in the particular environment on the PaaS platform (e.g., building, installing, or testing the package). In this case, the build system may perform the authentication with the PaaS platform for the particular environment and the action(s) performed in the particular environment on the PaaS platform may be executed by the build system in an ephemeral environment (e.g., an ephemeral container or computing environment) that is destroyed or deleted at the end of the action(s), thus also destroying or deleting the authentication key. This may prevent a copy of the authentication key from remaining on the build system after the action(s) is completed, which increases security and decreases the risk of unauthorized access to the PaaS platform.

Figure 1C:
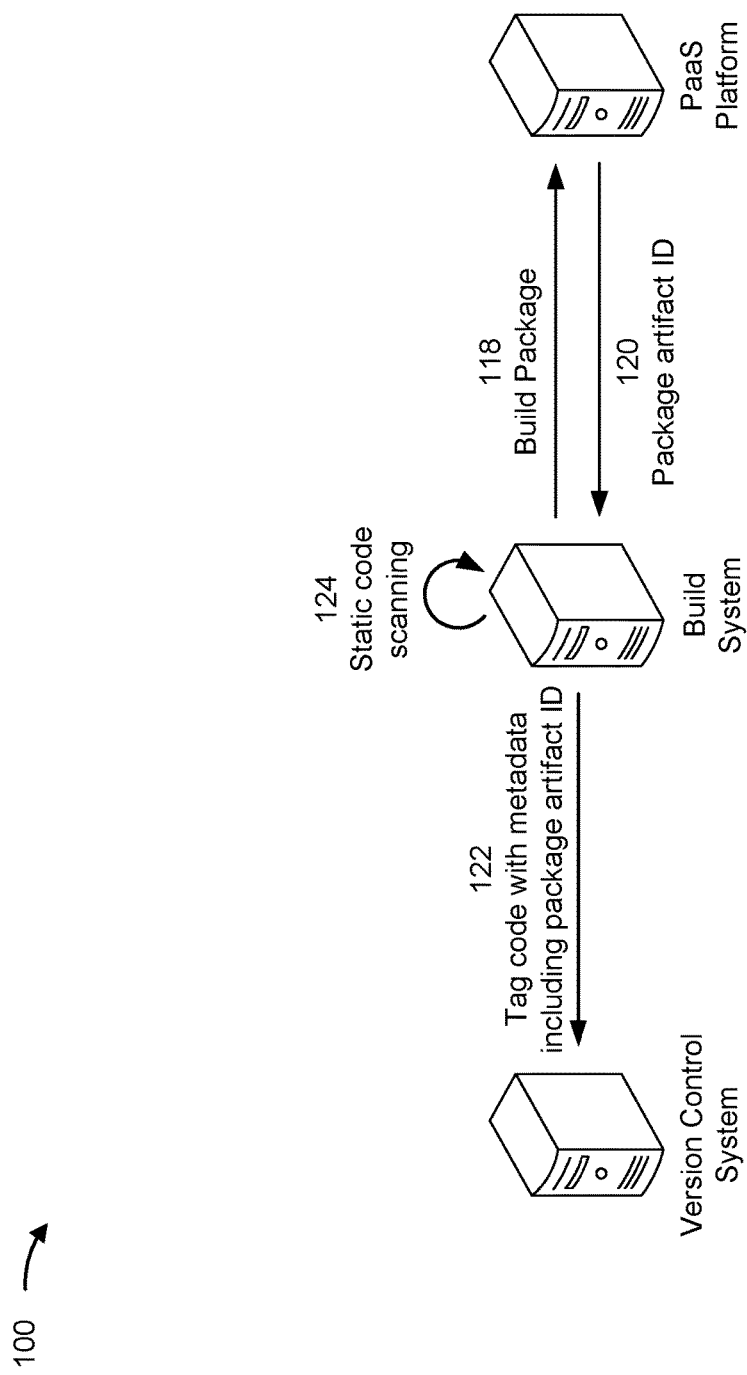

As shown in FIG. 1C, and by reference number 118, the build system may build a package corresponding to the updated code on the PaaS platform. The build system may communicate with the PaaS platform to register and build a package corresponding to the updated code on the PaaS platform. In some implementations, the build system may register and build the package based on information in the configuration file. The build system may receive error outputs from the PaaS platform based on (e.g., in response to) requests transmitted to the PaaS platform, and the build system may be configured to automatically make corrections based on certain error outputs and continue with registering and/or building the package. In this case, the build system may also report the error outputs to the user device, for example in the status report generated by the version control system.

In some implementations, once the build system is authenticated with the PaaS platform for the package registration environment, the build system may resolve a package name associated with the updated code to a unique package identifier (e.g., package ID) on the PaaS platform. For example, the source code stored in the version control system may correspond to a package that is deployed on the PaaS platform, and the package being built that corresponds to the updated code may be an updated version of the package that corresponds to the source code. In this case, the package being built may have the same package ID as the already-deployed package that corresponds to the source code, and the build system may determine the package ID by searching the package registration environment on the PaaS platform based on the package name. In some cases, when trying to resolve the package name to the package ID, the build system may receive an error message indicating that the package name has not been registered to a package ID. For example, the build system may receive such an error message when no previous version of the package has been deployed on the PaaS platform. In this case, the build system may use information from the configuration file, which may be stored in the version control system for the application, to register the package name as a newly created package and receive, from the PaaS platform, the package ID associated with the package.

The build system may then transmit, to the PaaS platform, a request for the PaaS platform to build a package artifact from the updated code. The package artifact may correspond to a particular version of the package built using the updated code. The package artifact may be an executable file that can be installed on the PaaS platform in order to deploy the new version of the package (or new package) on the PaaS platform. The PaaS platform may build the package artifact from the updated code based on the request from the build system and assign a unique package artifact identifier (e.g., package artifact ID) to the package artifact.

As further shown in FIG. 1C, and by reference number 120, the build system may receive, from the PaaS platform, the package artifact ID for the package artifact built on the PaaS platform. Since the package artifact corresponds to a specific version of the package, the package artifact ID may be used to identify the version of the package that corresponds to the updated code.

As further shown in FIG. 1C, and by reference number 122, the build system may tag the updated code in the version control system with the package artifact ID. The build system may transmit the package artifact ID to the version control system, and the version control system may add the package artifact ID as a metadata tag to the specific commit that corresponds to the updated code used to build the package artifact. This enables a specific version of the code to be resolved to a package artifact, via the version control system. In some implementations, the package artifact ID tag may serve as a package version ID for the updated code. In some implementations, a human readable package version number that is associated with the package artifact ID may also be added as a metadata tag to the specific commit that corresponds to the updated code used to build the package artifact. Each commit in the version control system may be associated with a unique commit hash. In some implementations, the build system may add, to metadata associated with the package artifact on the PaaS platform, the commit hash associated with the specific commit corresponding to the updated code used to generate the package artifact. In this way, the package registry on the PaaS platform may include metadata that associates the package artifact with the specific version of the code in the version control system. This enables a specific package artifact to be traced to the specific version of the code in the version control system, via the package registry on the PaaS platform. Thus, source code and package artifacts may be coupled in both the version control system and package registry on the PaaS platform.

As further shown in FIG. 1C, and by reference number 124, the build system may perform static code scanning on the updated code used to build the package artifact. The static code scanning (also referred to as "static code analysis") may be performed using one or more static code scanners (e.g., static code analysis tools) identified in the configuration file. The static code scanner(s) may scan the updated code based on static scanning rules to check for license issues, security vulnerabilities, compliance with coding guidelines (e.g., best practices), and/or unit test code coverage, among other examples. For example, one or more of the static code scanners may perform static application security testing (SAST) on the updated code. In some implementations, the static code scanner(s) identified in the configuration file may include one or more static code scanners that are executed on the build system. In some implementations, the static code scanner(s) identified in the configuration file may include one or more third-party static code scanning services or tools. In this case, the build system may utilize the third-party static code scanning services or tools to perform the static code scanning. For example, the build system may transmit or upload the updated code to a third-party static code scanning service, and the build system may receive static code scanning results for the updated code from the third-party static code scanning service.

In some implementations, if low-risk problems are found in the static code scanning (e.g., determined based on comparing a risk score to a threshold or based on a type of problem, bug, or error), the build system may open a ticket in the current source code repository in the version control system and continue with the automated build procedure. In some implementations, is high-risk or critical problems are found in the static code scanning (e.g., determined based on comparing a risk score to a threshold or based on a type of problem, bug, or error), the build system may halt the automated build procedure so the problems may be resolved before deploying the corresponding package on the PaaS platform.

Figure 1D:
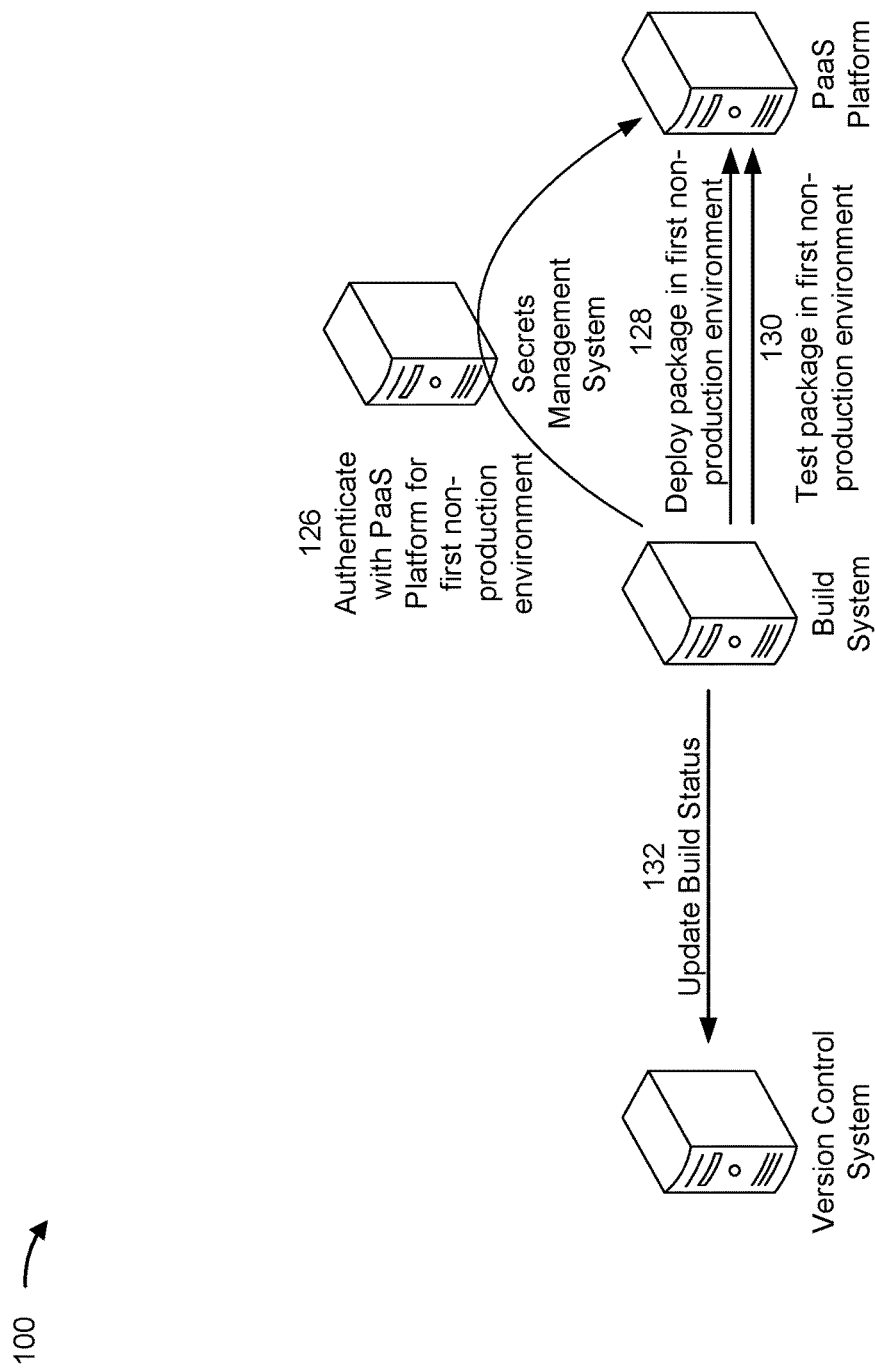

As shown in FIG. 1D, and by reference number 126, the build system may authenticate with the PaaS platform for a first non-production environment. A non-production environment may be any environment other than the production environment. In some implementations, the first non-production environment may be a development environment. The build system may interact with the secrets management system and perform the authentication with the PaaS platform for the first non-production environment (e.g., the development environment) as described above in connection with FIG. 1B.

As further shown in FIG. 1D, and by reference number 128, the build system may deploy the package in the first non-production environment on the PaaS platform. The build system may identify the package artifact on the PaaS platform that corresponds to the updated code using the package artifact ID in the metadata tag in the version control system and/or the package version number in the metadata tag that is associated with the package artifact ID. The build system may determine whether package dependencies are satisfied for the target environment in which the package is being deployed (e.g., the first non-production environment). For example, package dependencies may be associated with other packages that need to be installed in the target environment for the current package to execute correctly. In some implementations, the build system may identify the package dependencies based on information in the configuration file. For example, the configuration file may include a list of package dependencies. Some package dependencies may be specific for the target environment (e.g., the development environment), and some package dependencies may apply to all environments. For each package dependency for the target environment, the build system may automatically determine whether a package associated with the dependency exists (e.g., is installed in) the target environment on the PaaS platform, and if so, whether the package associated with the dependency in the target environment is the correct version. For example, the build system may search the registry of the PaaS platform and compare names and/or IDs of packages installed on the target environment with the list of dependencies in the configuration file. In a case in which the build system determines that a package associated with a dependency (or the correct version of a package associated with a dependency) is not installed on the target environment, the build system may generate an alert message and transmit the alert message to the user device (e.g., directly or via the version control system) to inform the user of the missing dependency. In a case in which the build system determines that the build system has proper access and right of install to a dependent package artifact, the build system may automatically install the dependent package artifact on behalf of the user.

The build system may determine a manner in which the package is installed in the target environment based on information in the configuration file. For example, the configuration file may include permission information that indicates, for each of one or more non-production environments, users permitted to access the package in that environment, and the build system may determine the users permitted to access the package in the target environment based on the permission information in the configuration file. Accordingly, the build system may automatically configure the package to be installed on the PaaS platform with different permissions in different environments, such that different users may access the package in the different non-production environments, such as the development environment, a quality assurance environment, and a user acceptance test environment, among other examples.

The build system may deploy the package in the target environment by automatically transmitting, to the PaaS platform, a request that the PaaS platform install the package artifact in the target environment. The build system may provide, to the PaaS platform, configuration information to configure the installation of the package in the target environment, for example to configure the permissions for users that are permitted to access the package in the target environment. The build system may validate the installation of the package artifact in the target environment. For example, the build system may determine whether the package artifact has been successfully installed in the target environment on the PaaS platform, such as by checking whether the package artifact ID exists in the target environment.

As further shown in FIG. 1D, and by reference number 130, the build system may test the package in the first non-production environment on the PaaS platform. For a target environment, such as the first non-production environment, the build system may automatically test the package in the target environment on the PaaS platform based on testing information for the target environment in the configuration file. In some implementations, the build system may perform unit testing on the package in the target environment based on unit testing information for the target environment in the configuration file, and the build system may perform integration testing on the package in the target environment based on integration testing information in the configuration file. The configuration file may include unit testing information and integration testing information for each non-production environment and for the production environment.

Unit testing refers to testing individual units, components, or functions of the package in the target environment. The unit testing information for the target environment in the configuration file may identify a set of unit tests to be performed on the package in the target environment. Each unit test, in the set of unit tests, may test a respective component or function of the package. For each unit test, the build system may automatically interact with the PaaS platform test whether the corresponding component or function of the package executes correctly in the target environment. In some implementations, one or more unit tests may be repeated in each target environment in order to test certain components and/or functions of the package in each target environment.

Integration testing refers to testing the package in the target environment with respect to functionality, user experience, and/or business requirements. The integration testing information for the target environment in the configuration file may specify a set of integration tests to be performed in the target environment. In order to perform an integration test, the build system may automatically interact with the PaaS platform to simulate a user interacting with the package in the target environment. For example, the integration testing information in the configuration file may indicate, for a particular integration test, a section of code that describes a series of steps to be performed using the package in the target environment and an expected result of the series of steps. For each integration test in the set of integration tests for the target environment, the build system may automatically interact with the PaaS platform to perform the series of steps indicated in the code for the integration test in the configuration file, and the build system may compare an actual result in the target environment on the PaaS platform with the expected result indicated in the configuration file.

The configuration file may indicate different sets of integration tests to be performed in different target environments. In some target environments, the integration tests may include integration tests that test the interaction between the current package being tested and other packages and/or applications deployed in the target environment (e.g., based on dependencies). In some implementations, a scope of the set of integration tests may increase with each successive non-production environment. For example, in the development environment (e.g., the first non-production environment), the integration tests may be focused on the functionality of the package, and in one or more subsequent non-production environments, such as a quality assurance environment and/or a user acceptance test environment, the integration tests may be expanded to also test the interaction of the package with other packages and/or applications deployed on the PaaS platform.

As further shown in FIG. 1D, and by reference number 132, the build system may update a build status stored by the version control system. For example, the build system may update the status information stored by the version control system to indicate that the package has been successfully deployed in the first non-production environment on the PaaS platform and to indicate that unit testing and integration testing have been performed for the package in the first non-production environment. The build system may transmit, to the version control system, the results of the unit testing and the integration testing in the first non-production environment, and the version control system may store the testing results for the first non-production environment. The version control system may provide, to the user device, an updated status report based on the updated status information received from the build system.

In some implementations, the build system may request user approval after deploying and testing the package in the first non-production environment. For example, the build system may request user approval after deploying and testing the package in the development environment, and prior to deploying the package in a quality assurance environment or a user acceptance test environment. In this case, the user device may receive, from the version control system, the status report and the testing results for the first non-production environment for the user to review in order for the user to determine whether to approve the changes to the code. The build system may wait to receive user approval before proceeding to deploy the package in the second non-production environment. In some implementations, after deploying and testing the package in the first non-production environment, the build system may automatically determine whether to proceed to deploy the package in the second non-production environment (e.g., without requesting user approval) based on the results of the unit testing and the accepting testing in the first non-production environment.

Figure 1E:
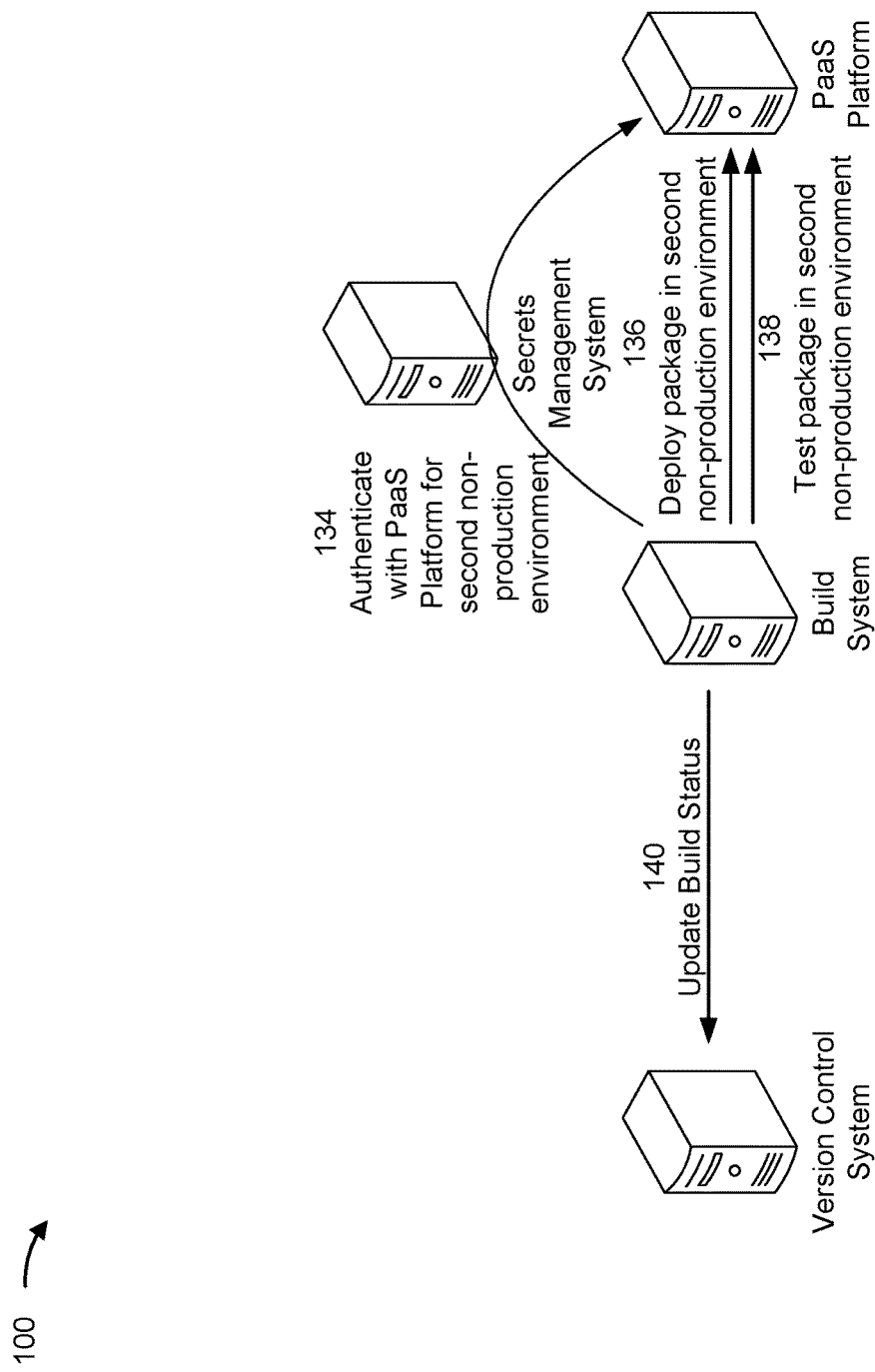

As shown in FIG. 1E, and by reference number 134, the build system may authenticate with the PaaS platform for a second non-production environment. In some implementations, the second non-production environment may be a pre-production environment in which the package may be deployed with applications that simulate the production environment, such as a quality of service environment or a user acceptance test environment. The build system may interact with the secrets management system and perform the authentication with the PaaS platform for the second non-production environment as described above in connection with FIG. 1B.

As further shown in FIG. 1E, and by reference number 136, the build system may deploy the package in the second non-production environment on the PaaS platform. The build system may deploy the package in the second non-production environment on the PaaS platform, in a similar manner as described above for the first non-production environment in connection with reference number 128.

As further shown in FIG. 1E, and by reference number 138, the build system may test the package in the second non-production environment on the PaaS platform. The build system may perform unit testing and integration testing on the package in the second-nonproduction environment on the PaaS platform based on testing information for the second non-production environment in the configuration file, in a similar manner as described above for the first non-production environment in connection with reference number 130. In some implementations, the integration testing in the second non-production environment (e.g., a quality assurance environment or a user acceptance test environment) may closely simulate user interaction with the package/application in the production environment.

As further shown in FIG. 1E, and by reference number 140, the build system may update a build status stored by the version control system. The build system may update the build status stored by the version control system based on successfully deploying and testing the package on the second non-production environment, in a similar manner as described above for the first non-production environment in connection with reference number 132.

In some implementations, the build system may deploy and test the package in one or more other non-production environments in addition to the first and second non-production environments. For example, the build system may also deploy and test the package in a third non-production environment using the techniques described above for the first and second non-production environment. In this case, the first non-production environment may be a development environment, the second non-production may be a quality assurance environment, and the third non-production environment may be a user acceptance test environment.

Figure 1F:
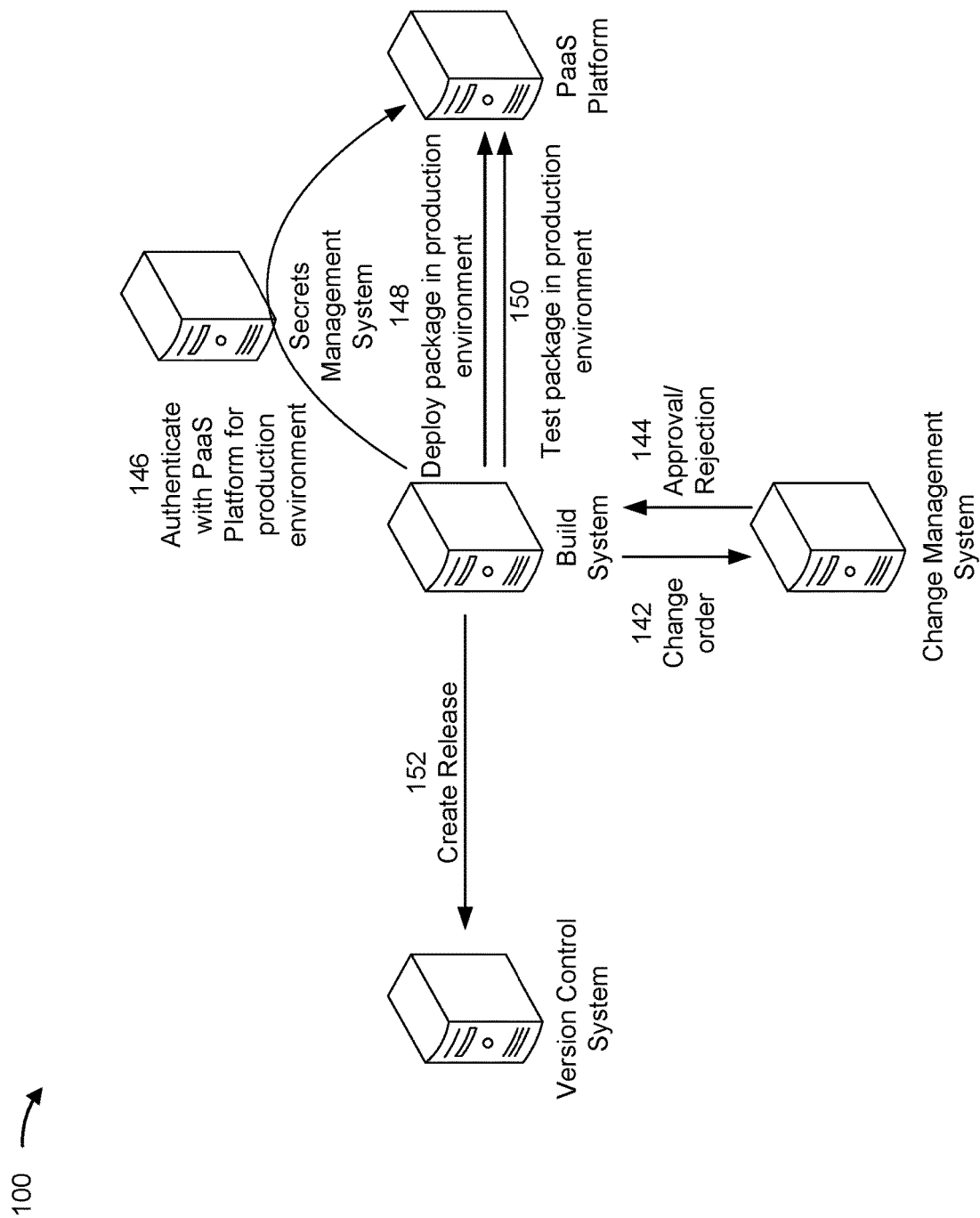

As shown in FIG. 1F, and by reference number 142, the build system may generate a change order and transmit the change order to the change management system. The change order may include a record of the changes made to the source code and evidence, collected by the build system throughout the automated build procedure, that the package is ready to be deployed in the production environment. For example, the change order may include information indicating the tests (e.g., unit tests and integration tests) performed on the package in each non-production environment and the results of the tests performed on the package in each non-production environment. The change order may also include results of the linting performed on the code and results of the static code scanning performed in the code.

As further shown in FIG. 1F, and by reference number 144, the change management system may transmit, to the build system, an approval or a rejection of the change order. In some implementations, the change management system may automatically determine whether to approve or reject deployment of the package in the production environment based on the change order received from the build system. For example, the change management system may automatically approve or reject deployment of the package in the production environment based on the results of the tests performed on the package on the non-productions environments and/or the other information included in the change order. For example, the test results may indicate a level of code coverage that is above or below a minimum permissible threshold. In this case, the change management system may transmit, to the build system, an automated approval or rejection of the change order.

In some implementations, a user who is authorized to approve the package for deployment in the production environment (an "authorized user") may review the change order to determine whether to ultimately approve or reject the change order in addition to the automated determination by the change management system. For example, in some implementations, the build system may transmit the change order to a device (e.g., a user device) of the authorized user prior to transmitting the change order to the change management system. In this case, the build system may transmit the change order to the change management system based on receiving approval from the authorized user. In some implementations, the change management system may transmit the change order to the device of the authorized user. In this case, the change management system may transmit the approval or rejection to the build system based on an approval or rejection from the authorized user and/or the automated approval or rejection determined by the change management system.

The build system may receive the approval or rejection from the change management system, and the build system may proceed with automated deployment of the package in the production environment on the PaaS platform based on receiving the approval from the change management system. In a case in which the build system receives a rejection from the change management system, the build system may transmit a message to the user device (e.g., directly or via the version control system) indicating that the change order has been rejected. In some cases, the rejection from the change management system may indicate a reason for the rejection. In this case, the build system may include the reason for the rejection in the message that is transmitted to the user device.

As further shown in FIG. 1F, and by reference number 146, the build system may authenticate with the PaaS platform for a production environment. The production environment is an environment in which applications are put into operation for their intended use for end users and in which the end users can interact with the applications. The build system may interact with the secrets management system and perform the authentication with the PaaS platform for the production environment as described above in connection with FIG. 1B.

As further shown in FIG. 1F, and by reference number 148, the build system may deploy the package in the production environment on the PaaS platform. The build system may automatically deploy the package in the production environment on the PaaS platform, in a similar manner as described above for the first and second non-production environments in connection with reference numbers 128 and 136. In some implementations, the build system may modify information associated with the package (e.g., may "promote" the package) to indicate that the package is "releaseable" (e.g., ready for release) on the PaaS platform prior to transmitting, to the PaaS platform, the request to install the package artifact in the production environment. For example, in some implementations, promoting the package may involve removing a pre-release suffix from the package (e.g., "-beta" or "-rc") to indicate to the PaaS platform that the package artifact is intended for the production environment.

As further shown in FIG. 1F, and by reference number 150, the build system may test the package in the production environment on the PaaS platform. The build system may perform unit testing and/or integration testing on the package in the production environment on the PaaS platform based on testing information for the production environment in the configuration file, in a similar manner as described above for the first and second non-production environments in connection with references numbers 130 and 138. Because the package has already been deployed in the production environment, the build system may perform the testing on the actual package/application in the production environment to confirm whether the package/application is functioning correctly in the production environment.

As further shown in FIG. 1F, and by reference number 152, the build system may create a release for the updated code in the version control system. The build system may assign, to the commit in the version control system (e.g., the updated code) that corresponds to the package artifact deployed in the production environment, a release identifier that associates the commit with the production-deployed version of the package. For example, the build system may interact with the version control system to modify (e.g., promote) the package artifact ID metadata tag (or the version number metadata tag) to a release tag based on the successful deployment of the package in the production environment. In this way, the version control system may maintain an accurate record of the specific versions of the code that correspond to packages deployed in the production environment, in addition to maintaining an accurate record of all package artifacts created by a particular project.

In some implementations, the build system may register all production releases with the change management system. For example, the change management system may store the change order associated with the deployment in the production environment, as well as information associated with the automated build procedure, such as a build uniform resource locator (URL), a build number, information that identifies the user who initiated the build, package details for the package deployed in the production environment, and/or information that identifies an installation time at which the package was deployed in the production environment, among other examples. The build URL may provide a link to information associated with the build in the version control system, such as the corresponding version of the code, the build status report, and/or the testing results, among other examples.

Although implementations are described herein in connection with deploying a package corresponding to updated code that includes changes to source code, the techniques described herein may be similarly applied to new code in order to deploy a first version of a package or application on the PaaS platform.

Using the techniques described herein enables automated deployment of changes to applications on a PaaS platform by automatically deploying and testing packages corresponding to such changes in one or more non-production environments and the production environment. As a result, deployment of changes to an application on the PaaS platform may be performed quickly with increased reliability, decreased errors, and decreased risks to other applications on the PaaS platform.

As indicated above, FIGS. 1A-1F are provided as an example. Other examples may differ from what is described with regard to FIGS. 1A-1F.

Figure 2:
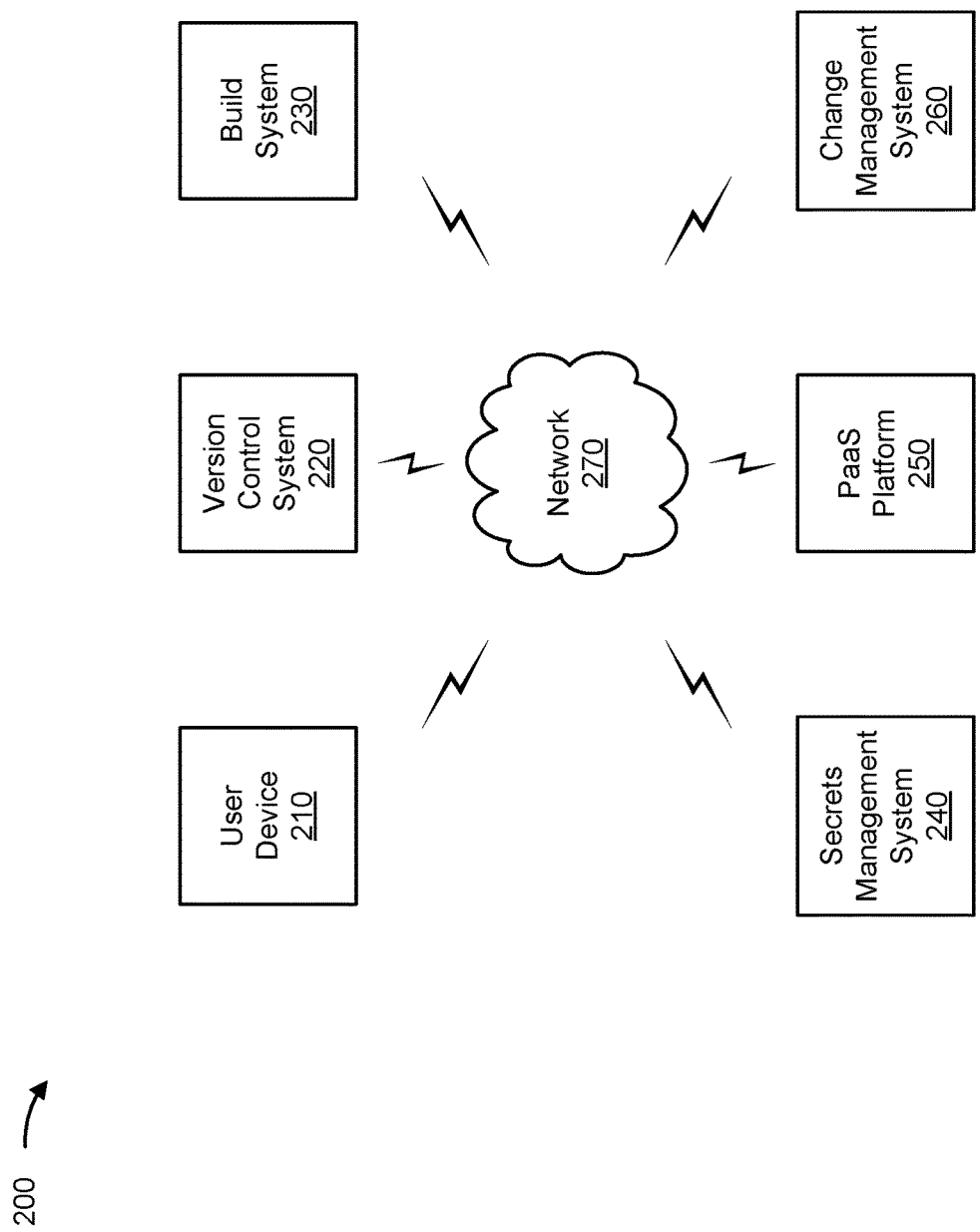
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a version control system 220, a build system 230, a secrets management system 240, a PaaS platform 250, a change management system 260, and a network 270. Devices of environment 200 may interconnect via wired connections, wireless connections, or a combination of wired and wireless connections.

The user device 210 includes one or more devices capable of receiving, generating, storing, processing, and/or providing information associated with automated deployment of changes to applications on a cloud computing platform, as described elsewhere herein. The user device 210 may include a communication device and/or a computing device. For example, the user device 210 may include a wireless communication device, a mobile phone, a user equipment, a laptop computer, a tablet computer, a desktop computer, or a similar type of device.

The version control system 220 includes one or more devices capable of receiving, generating, storing, processing, providing, and/or routing information associated with automated deployment of changes to applications on a cloud computing platform, as described elsewhere herein. The version control system 220 may include a communication device and/or a computing device. For example, the version control system 220 may include a server, such as an application server, a client server, a web server, a database server, a host server, a proxy server, a virtual server (e.g., executing on computing hardware), or a server in a cloud computing system. In some implementations, the version control system 220 includes computing hardware used in a cloud computing environment.

The build system 230 includes one or more devices capable of receiving, generating, storing, processing, providing, and/or routing information associated with automated deployment of changes to applications on a cloud computing platform, as described elsewhere herein. In some implementations, the build system 230 includes one or more devices capable of continuous integration and continuous delivery (CI/CD). The build system 230 may include a communication device and/or a computing device. For example, the build system 230 may include a server, such as an application server, a client server, a web server, a database server, a host server, a proxy server, a virtual server (e.g., executing on computing hardware), or a server in a cloud computing system. In some implementations, the build system 230 includes computing hardware used in a cloud computing environment.

The secrets management system 240 includes one or more devices capable of receiving, generating, storing, processing, providing, and/or routing sensitive and/or secret information associated with automated deployment of changes to applications on a cloud computing platform, as described elsewhere herein. The secrets management system 240 may include a communication device and/or a computing device. For example, the secrets management system 240 may include a server, such as an application server, a client server, a web server, a database server, a host server, a proxy server, a virtual server (e.g., executing on computing hardware), or a server in a cloud computing system. In some implementations, the secrets management system 240 includes computing hardware used in a cloud computing environment.

The PaaS platform 250 includes one or more devices capable of receiving, generating, storing, processing, providing, and/or routing information associated with automated deployment of changes to applications on a cloud computing platform, as described elsewhere herein. In some implementations, the PaaS platform 250 includes computing hardware used in a cloud computing environment. For example, the PaaS platform 250 may be a cloud computing platform that includes hardware and corresponding resources from one or more computing devices and/or communication devices. The PaaS platform 250 may include one or more servers, such as an application server, a client server, a web server, a database server, a host server, a proxy server, a virtual server (e.g., executing on computing hardware), and/or a server in a cloud computing system, as well as one or more devices that support networking capabilities, such as a load balancer, a domain name server, a traffic routing server, and/or a content management system.

The change management system 260 includes one or more devices capable of receiving, generating, storing, processing, providing, and/or routing information associated with automated deployment of changes to applications on a cloud computing platform, as described elsewhere herein. The change management system 260 may include a communication device and/or a computing device. For example, the change management system 260 may include a server, such as an application server, a client server, a web server, a database server, a host server, a proxy server, a virtual server (e.g., executing on computing hardware), or a server in a cloud computing system. In some implementations, the change management system 260 includes computing hardware used in a cloud computing environment.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
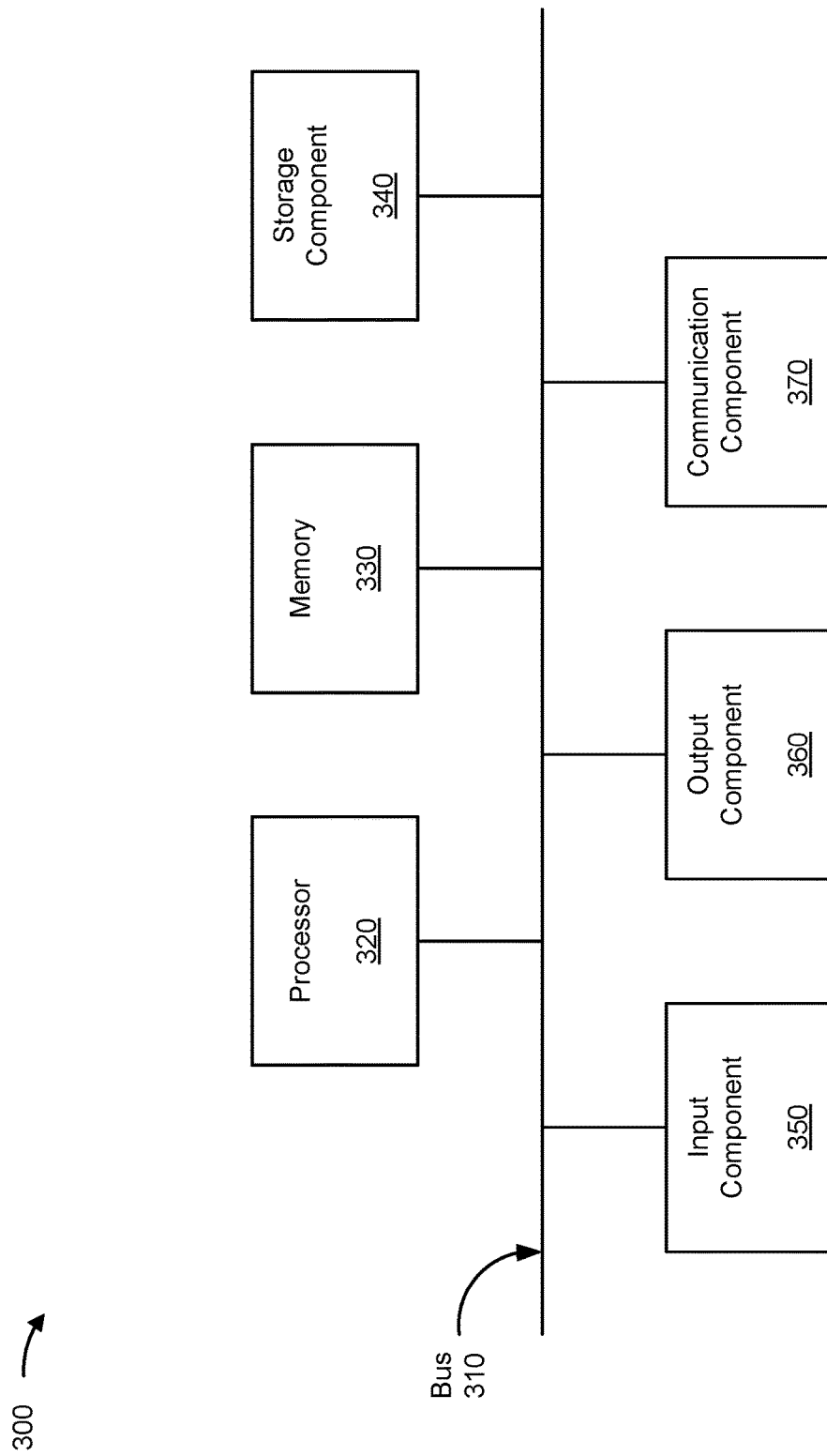
FIG. 3 is a diagram of example components of one or more devices of FIG. 2.

FIG. 3 is a diagram of example components of a device 300, which may correspond to user device 210, version control system 220, build system 230, secrets management system 240, PaaS platform 250, and/or change management system 260. In some implementations, user device 210, version control system 220, build system 230, secrets management system 240, PaaS platform 250, and/or change management system 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with automated deployment of changes to applications on a cloud computing platform. In some implementations, one or more process blocks of FIG. 4 may be performed by a system (e.g., build system 230). In some implementations, one or more process blocks of FIG. 4 may be performed by another device or a group of devices separate from or including the system, such as user device 210, version control system 220, secrets management system 240, PaaS platform 250, and/or change management system 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving code for a package to be deployed on a cloud computing platform (block 410). As further shown in FIG. 4, process 400 may include causing the cloud computing platform to build the package from the code (block 420). As further shown in FIG. 4, process 400 may include installing the package on the cloud computing platform in a first non-production environment, wherein the first non-production environment is a development environment (block 430). As further shown in FIG. 4, process 400 may include automatically testing the package in the first non-production environment based on first testing information for the first non-production environment in a configuration file associated with the code (block 440). As further shown in FIG. 4, process 400 may include deploying the package on the cloud computing platform in a production environment (block 450). As further shown in FIG. 4, process 400 may include automatically testing the package in the production environment based on second testing information for the production environment in the configuration file (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for deploying an updated software package on a cloud computing platform, the system comprising:
one or more memories; and one or more processors, communicatively coupled to the one or more memories, configured to:
receive, from a version control system storing source code for a software package deployed on the cloud computing platform, updated code including one or more changes to the source code;
cause, based on receiving the updated code, a build system to initiate an automated build procedure for the updated code,
wherein a configuration file, that includes information associated with controlling the automated build procedure, is stored on the version control system;
perform first authentication of the build system with the cloud computing platform for a package registration environment,
wherein the first authentication comprises performing a local checkout of a particular authentication key associated with the package registration environment, wherein the particular authentication key is valid for a particular span of one or more actions being performed in the package registration environment,
wherein the particular span of the one or more actions being performed includes at least one of building, installing, or testing,
wherein the particular authentication key is deleted when the particular span of the one or more actions ends, to prevent a copy of the particular authentication key from remaining after the particular span of the one or more actions being performed ends, and
wherein the authentication is performed in an ephemeral environment that is destroyed when the particular span of the one or more actions being performed ends;
build, based on the first authentication, an updated package corresponding to the updated code in the package registration environment on the cloud computing platform;
perform second authentication of the build system with the cloud computing platform for one or more non-production environments;
automatically deploy, based on the second authentication, the updated package on the cloud computing platform in each of the one or more non-production environments and test the updated package in each of the one or more non-production environments based on respective testing information for each of the one or more non-production environments in the configuration file associated with the updated code;
perform third authentication of the build system with the cloud computing platform for a production environment; and
automatically deploy, based on the third authentication, the updated package on the cloud computing platform in the production environment and test the updated package in the production environment based on testing information for the production environment in the configuration file.

2. The system of claim 1, wherein the one or more processors are further configured to:
perform linting of the updated code based on linting rules identified in the configuration file.

3. The system of claim 1, wherein the one or more processors are further configured to:
perform static scanning of the updated code using one or more static code scanners identified in the configuration file.

4. The system of claim 1, the one or more processors, when performing the first authentication, are configured to:
determine, based on an account credential, secrets management system authentication information and platform information for the package registration environment;
authenticate with a secrets management system using the secrets management system authentication information;
receive, from the secrets management system, an authentication key; and
authenticate the build system with the cloud computing platform for the package registration environment using the authentication key and based on the platform information for the package registration environment.

5. The system of claim 1, wherein the one or more processors, when automatically deploying the updated package on the cloud computing platform and testing the updated package, are configured to:
for each environment of the one or more non-production environments and the production environment:
install the updated package on the cloud computing platform in the environment;
perform unit testing on the updated package in the environment based on unit testing information for the environment in the configuration file; and
perform integration testing on the updated package in the environment based on integration testing information for the environment in the configuration file.

6. The system of claim 1, wherein the one or more processors, when automatically deploying the updated package on the cloud computing platform in each of the one or more non-production environments and testing the updated package in each of the one or more non-production environments, are configured to:
deploy the updated package on the cloud computing platform in a first non-production environment, wherein the first non-production environment is a development environment;
test the updated package in the first non-production environment based on first testing information for the first non-production environment in the configuration file;
deploy the updated package on the cloud computing platform in a second non-production environment, wherein the second non-production environment is a quality assurance environment or a user acceptance test environment; and
test the updated package in the second non-production environment based on second testing information for the second non-production environment in the configuration file.

7. The system of claim 6, wherein the second non-production environment is the quality assurance environment, and the one or more processors, when automatically deploying the updated package on the cloud computing platform in each of the one or more non-production environments and testing the updated package in each of the one or more non-production environments, are further configured to:
deploy the updated package on the cloud computing platform in a third non-production environment, wherein the third non-production environment is the user acceptance test environment; and
test the updated package in the third non-production environment based on third testing information for the third non-production environment in the configuration file.

8. The system of claim 1, wherein the one or more processors are further configured to transmit a change order to a change management system, and receive, from the change management system, an automated approval or rejection based on the change order, and
wherein the one or more processors, when automatically deploying the updated package on the cloud computing platform in the production environment, are configured to:
deploy the updated package in the production environment based on receiving the automated approval from the change management system.

9. The system of claim 1, wherein the one or more processors are further configured to:
assign a release identifier to the updated code in the version control system based on deploying the updated package in the production environment.

10. The system of claim 1, wherein the one or more processors are further configured to:

communicate, with the cloud computing platform, to build the updated package on the cloud computing platform; and receive, from the cloud computing platform and based on building the updated package on the cloud computing platform, an identifier associated with a package artifact related to the updated package built on the cloud computing platform.

11. The system of claim 1, wherein the one or more processors are further configured to:
generate change order information;
transmit, to a change management system, the change order information; and
receive, based on transmitting the change order information, information associated with a result of approval of the change order information,
wherein the third authentication is based on receiving a result of approval of the change order information.

12. A method of deploying a package on a cloud computing platform, comprising:
receiving, by a system, code for a package to be deployed on the cloud computing platform,
wherein the system comprises one or more devices;
causing, by the system and based on receiving the code, a build system associated with the system to initiate an automated build procedure for the code,
wherein a configuration file, that includes information associated with controlling the automated build procedure, is stored on a version control system associated with the system;
performing, by the system, first authentication of the build system with the cloud computing platform for a package registration environment,
wherein the first authentication comprises performing a local checkout of a particular authentication key associated with the package registration environment,
wherein the particular authentication key is valid for a particular span of one or more actions being performed in the package registration environment,
wherein the particular span of the one or more actions being performed includes at least one of building, installing, or testing,
wherein the particular authentication key is deleted when the particular span of the one or more actions ends, to prevent a copy of the particular authentication key from remaining after the particular span of the one or more actions ends, and
wherein the authentication is performed in an ephemeral environment that is destroyed when the particular span of the one or more actions ends;
building, based on the first authentication, the package corresponding to the code;
performing, by the system, second authentication of the build system with the cloud computing platform for a first non-production environment;
installing, by the system and based on the second authentication, the package on the cloud computing platform in the first non-production environment, wherein the first non-production environment is a development environment;
automatically testing, by the system, the package in the first non-production environment based on first testing information for the first non-production environment in the configuration file associated with the code;
performing, by the system, third authentication of the build system with the cloud computing platform for a production environment;
deploying, by the system and based on the third authentication, the package on the cloud computing platform in the production environment; and
automatically testing the package in the production environment based on second testing information for the production environment in the configuration file.

13. The method of claim 12, further comprising:
installing, by the system prior to deploying the package in the production environment, the package on the cloud computing platform in a second non-production environment; and
automatically testing, by the system prior to deploying the package in the production environment, the package in the second non-production environment based on third testing information for the second non-production environment in the configuration file.

14. The method of claim 12, wherein the first authentication is performed prior to causing the cloud computing platform to build the package,
wherein the second authentication is performed prior to installing the package in the first non-production environment, and
the third authentication is performed prior to deploying the package in the production environment.

15. The method of claim 12, further comprising:
tagging, by the system, the code with metadata including a package version identifier associated with the package.

16. The method of claim 12, wherein the package is an update to a previous version of the package deployed on the cloud computing platform in the production environment, and the code includes one or more changes from source code for the previous version of the package.

17. A non-transitory computer-readable medium storing a set of instructions, the set of instructions comprising:
one or more instructions that, when executed by one or more processors of a system, cause the system to:
receive, from a version control system storing source code for a software package deployed on a cloud computing platform, updated code including one or more changes to the source code;
cause, based on receiving the updated code, a build system to initiate an automated build procedure for the updated code,
wherein a configuration file, that includes information associated with controlling the automated build procedure, is stored on the version control system; perform first authentication of the build system with the cloud computing platform for a package registration environment,
wherein the first authentication comprises performing a local checkout of a particular authentication key associated with the package registration environment,
wherein the particular authentication key is valid for a particular span of one or more actions being performed in the package registration environment,
wherein the particular span of the one or more actions being performed includes at least one of building, installing, or testing,
wherein the particular authentication key is deleted when the particular span of the one or more actions ends, to prevent a copy of the particular authentication key from remaining after the particular span of the one or more actions ends, and
wherein the authentication is performed in an ephemeral environment that is destroyed when the particular span of the one or more actions ends;

build, based on the first authentication, an updated package corresponding to the updated code in the package registration environment on the cloud computing platform;
perform second authentication of the build system with the cloud computing platform for one or more non-production environments;
for each environment of the one or more non-production environments:
install the updated package on the cloud computing platform in the environment, and
test the updated package in the environment based on testing information for the environment in the configuration file associated with the updated code;
perform third authentication of the build system with the cloud computing platform for a production environment; and
deploy, based on the third authentication, the updated package on the cloud computing platform in the production environment.

18. The non-transitory computer-readable medium of claim 17, wherein the one or more instructions, when executed by the one or more processors, further cause the build system to:
test the updated package on the cloud computing platform in the production environment based on testing information for the production environment in the configuration file.

19. The non-transitory computer-readable medium of claim 17, wherein the one or more instructions, when executed by the one or more processors, further cause the build system to generate a change order including results of testing the updated package in each of the one or more non-production environments, and wherein the one or more instructions, that cause the build system to deploy the updated package on the cloud computing platform in the production environment, cause the build system to:
deploy the updated package on the cloud computing platform in the production environment based on an automated approval of the change order.

20. The non-transitory computer-readable medium of claim 17, wherein the one or more non-production environments include a development environment and at least one of a quality assurance environment or a user acceptance test environment.

* * * * *